United States Patent [19]

Nishikawa et al.

[11] Patent Number: 4,522,866

[45] Date of Patent: Jun. 11, 1985

[54] ELASTOMER MEMBER WITH NON-TACKY SURFACE TREATING LAYER AND METHOD OF MANUFACTURING SAME

[75] Inventors: Masaji Nishikawa, Hachioji; Takeji Takagi, Machida; Masao Ueki, Hachioji, all of Japan

[73] Assignee: Olympus Optical Co., Ltd., Japan

[21] Appl. No.: 354,359

[22] Filed: Mar. 3, 1982

[30] Foreign Application Priority Data

Apr. 23, 1981 [JP] Japan ................................ 56-61584

[51] Int. Cl.[3] ........................ B32B 7/12; B32B 27/40; G03G 15/20; B21B 31/08

[52] U.S. Cl. ...................................... 428/216; 29/132; 118/60; 430/99; 432/60; 156/331.7; 427/379; 427/388.1; 427/393.5; 427/385.5; 427/409; 428/214; 428/215; 428/421; 428/422; 428/423.1; 428/423.9; 428/424.6; 428/424.8; 428/425.9; 428/463

[58] Field of Search ..................... 428/422, 421, 424.6, 428/215, 216, 334–336, 214, 425.9, 424.8, 423.1, 463, 423.9; 156/272.6, 331.7; 29/132; 118/60; 432/60; 430/99; 427/409, 379, 388.1, 393.5, 385.5

[56] References Cited

U.S. PATENT DOCUMENTS

| | | | |
|---|---|---|---|
| 2,945,773 | 7/1960 | Panagrossi | 428/422 |
| 3,345,942 | 10/1967 | Meltz | 29/132 |
| 3,398,043 | 8/1968 | Youngs | 428/447 |
| 3,702,482 | 11/1972 | Dolcimascolo et al. | 346/74 ES |
| 3,731,146 | 5/1973 | Bettiga | 118/653 |
| 3,754,963 | 8/1973 | Chang | 418/261 |
| 3,967,042 | 6/1976 | Laskin | 428/447 |
| 4,015,046 | 3/1977 | Pinkston | 428/422 |
| 4,098,631 | 7/1978 | Stryjewski | 29/132 |
| 4,149,797 | 4/1979 | Imperial | 29/132 |

FOREIGN PATENT DOCUMENTS 51-12143 1/1976 Japan .

*Primary Examiner*—Ellis P. Robinson
*Attorney, Agent, or Firm*—Ostrolenk, Faber, Gerb & Soffen

[57] ABSTRACT

An elastomer member with non-tacky surface treating layer is disclosed as well as a method of manufacturing same. An elastic adhesive layer is provided between a base elastomer member and a non-tacky surface treating layer which comprises hydrocarbon polymer, thereby improving the bonding strength of the surface treating layer and the resistance to organic solvent and crack resistance.

9 Claims, 4 Drawing Figures

ELASTOMER MEMBER WITH NON-TACKY SURFACE TREATING LAYER AND METHOD OF MANUFACTURING SAME

BACKGROUND OF THE INVENTION

The invention relates to an elastomer member with non-tacky surface treating layer and a method of manufacturing the same, and more particularly, to an elastomer member which may be used as a transfer, a developing or a conveyor roller or belt in an electrophotographic copying system and which is provided with a non-tacky surface treating layer in order to prevent contamination thereof as a result of the deposition of toner thereon, and a method of manufacturing the same.

As is well recognized, an electrophotographic copying system utilizes a variety of elastomer members acting as conveyor rollers or belts for a sheet carrying an unfixed toner image thereon, transfer roller or belt which urges a sheet in superimposed relationship with a toner image to effect a transfer of the toner image, and developing roller or belt as may be used in an impression developing unit (see U.S. Pat. Nos. 3,731,146 and 3,754,963). Considering a roller, by way of example, a conventional elastomer member of the kind described generally comprises a core metal which is surrounded by a layer of material, or elastomer, having a rubber-like elasticity under normal temperatures.

When these elastomer rollers are utilized as conveyor, transfer and developing rollers where they are subject to contamination by toner, the deposition of the toner onto the roller surface causes the sheet to be marred by toner.

To avoid this problem, there has been proposed a technique whereby a surface treating layer of a material which is different from the material forming the elastomer layer is deposited on the surface of the elastomer roller.

In one technique, a roller which is intended to be used in the transfer of a toner image is subject to a surface treatment with a material of the similar kind as that used to form the elastomer layer in order to prevent the deposition of toner on the roller and the ionization of the atmosphere surrounding the roller. According to this technique, the elastomer layer comprises polyurethane elastomer to which a treating agent which adjusts the resistivity is added, and an elastic polyurethane having an increased resistivity is coated over the surface of the elastomer layer to a thickness of about six microns to provide a surface treating layer. Since the surface treating layer comprises an elastic material, there is no likelihood that cracks will be developed in the surface treating layer, and the formation of the surface treating layer and the inner elastomer layer of materials of a same character achieves a good bond between the both layers.

However, the inner elastomer layer may be formed from a variety of materials, and it is not assured that the surface treating layer can be formed of a material of the same character as the inner elastomer layer. Where a different material is used to form the surface treating layer, problems arise in respect to the occurrence of cracks or the insufficient bonding strength. In addition, the use of a usual material to form the surface treating layer cannot satisfactorily prevent the deposition of toner.

Another technique has then been proposed to utilize fluorocarbon polymers such as polytetrafluoroethylene (hereafter referred to as "PTFE") to form the surface treating layer in consideration of the non-tackiness of the fluorocarbon polymers.

FIG. 1 shows one form of conventional elastomer roller having a non-tacky surface treating layer on its surface. The roller shown comprises a solid cylindrical core metal 1 having a pair of support shafts 1*a* integrally formed on its opposite ends (only one shaft 1*a* is shown), an inner elastomer layer 2 disposed in surrounding relationship with the core metal 1, and a non-tacky surface treating layer 3 which is applied to the peripheral surface of the elastomer layer 2. The inner elastomer layer 2 may be formed of materials such as polyurethane elastomer, nitryl rubber, butyl rubber, chloroprene rubber, natural rubber and the like, which may be used either along or blended with a variety of additives such as a resistivity controlling agent. The non-tacky surface treating layer 3 is formed of a fluorocarbon polymer such as PTFE.

A fluorocarbon polymer such as PTFE does not dissolve in an organic solvent, and hence the surface treating layer 3 cannot be formed by coating the inner elastomer layer with a solution of fluorocarbon polymer. The material which forms the inner elastomer layer 2 generally has a reduced resistance to heat, and this prevents the fluorocarbon polymer such as PTFE from being directly applied thereto by baking. Accordingly, in order to form the surface treating layer 3 by a low temperature treatment, powder of the fluorocarbon polymer such as PTFE is suspended in a solution of binder resin, and the suspension is applied to the surface of the layer 2. The binder resin may comprise polymethyl methacrylate, cellulose, phenol, polyester polyimide or the like. The surface treating layer 3 thus applied and including the fluorocarbon polymer is converted into a hardened film:

(a) by evaporating the solvent under normal temperature to form a hardened film, or (b) by heating it to a low temperature on the order of 120° to 150° C. to cause a polymerizaton and hardening of the binder resin.

The hardened film formed to provide the surface treating layer 3 according to the process (a) has a degraded resistance to organic solvents, and can be easily dissolved as its surface is cleaned with an organic solvent of a reduced dissolving power such as trichlorotrifluoroethane. On the other hand, the hardened film obtained by the process (b) results in an increased film thickness which is liable to produce cracks therein. In addition, when such film is deformed by the application of an external force, the surface treating layer 3 cannot closely follow the deformation of the inner elastomer layer 2, disadvantageously resulting in an exfoliation.

SUMMARY OF THE INVENTION

It is an object of the invention to provide an elastomer member having a surface treating layer which permits a cleaning with an organic solvent and which has a satisfactory bonding strength without producing cracks therein, and a method of manufacturing same.

The elastomer member of the invention is characterized by the presence of a layer of elastic adhesive which is interposed between a non-tacky surface treating layer of fluorocarbon polymer and a base elastomer layer.

The method of manufacturing an elastomer member according to the invention comprises applying a non-tacky surface treating layer of fluorocarbon polymer before solidification of a layer of elastic adhesive which is applied to a base elastomer layer, and applying heat to the treating layer to cause a hardening thereof.

With the elastomer member of the invention, the presence of the layer of elastic adhesive interposed between the base layer and the non-tacky surface treating layer improves the bonding strength of the surface treating layer, allowing the surface treating layer having a resistance to organic solvent to be formed on the base elastomer layer without producing any crack therein.

In the method of the invention, the non-tacky surface treating layer is applied before solidification of the layer of elastic adhesive, and is heated to cause a hardening thereof, thereby allowing an elastomer member to be manufactured to which a surface treating layer is bonded with an increased bonding strength.

DESCRIPTION OF PREFERRED EMBODIMENTS

Figure 2:
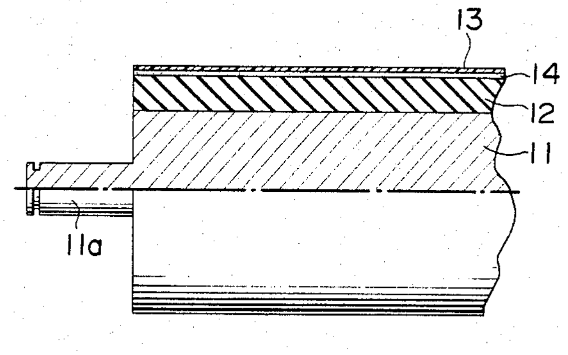
FIG. 2 is a cross section of an elastomer roller with non-tacky surface treating layer formed according to one embodiment of the invention.

Referring to FIG. 2, there is shown an elastomer roller with non-tacky surface treating layer formed according to one embodiment of the invention. As shown, the roller comprises a solid cylindrical core metal 11 having a pair of support shafts 11*a* (only one of which is shown) integrally formed on its opposite ends, an inner elastomer layer 12 applied around the peripheral surface of the core metal 11, an elastic adhesive layer 14 which is deposited around the peripheral surface of the elastomer layer 12, and a non-tacky surface treating layer 13 of fluorocarbon polymer which is deposited around the surface of the elastic adhesive layer 14.

Figure 1:
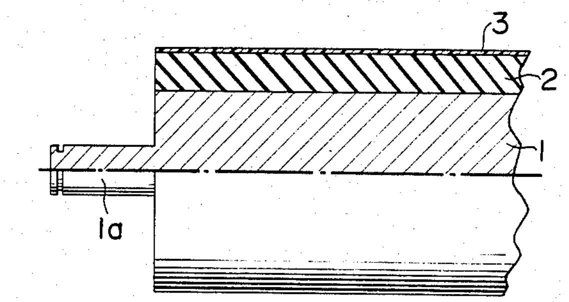
FIG. 1 (PRIOR ART)
FIG. 1 is a schematic cross section of one form of conventional elastomer roller with non-tacky surface treating layer.

In a similar manner to the inner elastomer layer 2 used in the conventional roller shown in FIG. 1, the inner elastomer layer 12 may comprise polyurethane elastomer, nitryl rubber, butyl rubber, chloroprene rubber, natural rubber or a mixture or polymeric composition thereof. The inner elastomer layer 12 is usually formed by baking the material upon the core metal 11 and polishing it.

The non-tacky surface treating layer 13 is formed by providing a suspension of powder of fluorocarbon polymer in a solution of binder resin, and applying the suspension to the surface of the elastic adhesive layer 14. A desirable binder resin has a resistance to reaction with organic solvents upon application of heat, and may comprise polyimide, epoxy resin, silicone resin or the like, for example. Preferred fluorocarbon polymers include polytetrafluoroethylene (PTFE), tetrafluoroethylene hexafluoropropylene copolymer (FEP), tetrafluoroethylene parafluoro alkyl vinyl ether polymer (PFA), polychlorotrifluoroethylene (PCTFE), ethylene tetrafluoroethylene copolymer (ETFE), ethylene chlorotrifluoroethylene copolymer (ECTFE), polyvinylidenefluoride (PVdF), polyvinyl fluoride (PVF) and the like.

It is necessary that the material used to form the elastic adhesive layer 14 be capable of forming a film which bonds with the elastomer layer 12 and exhibits a uniform rubber-like elasticity, upon being applied to the elastomer layer 12 and drying. It preferably comprises a synthetic rubber such as nitryl rubber or chloroprene rubber, ethylene vinyl acetate copolymer, polyurethane rubber or the like. The most preferred material is polyurethane rubber because of its excellent mechanical strength.

While it is possible to form the elastic adhesive layer 14 of only the described materials or mixture thereof, a plasticizer may be contained therein in order to achieve a suitable magnitude of rubber-like elasticity. However, it is preferred not to use the plasticizer since it may permeate through the surface treating layer 13 to cause the toner to be dissolved, which then may deposite upon the roller. The bonding strength between the surface treating layer 13 and the elastic adhesive layer 14 can be improved by applying the layer 13 before solidification of the layer 14, but may also be improved by admixing other adhesive. In this instance, it is necessary to choose an adhesive which is wholly or partly compatible with the material which exhibits the rubber-like elasticity.

The conductivity and the thickness of the elastomer layer 12 as well as the thickness of the elastic adhesive layer 14 and the non-tacky surface treating layer 13 are chosen to provide an optimum result depending on the intended use. For example, if the elastomer layer 12 is semiconductive, and the surface treatment must not greatly influence the resistivity thereof, it is preferred to finish the elastic adhesive layer 14 and the surface treating layer 13 as thin as possible, as consistent with their effectiveness. When the elastomer layer 12 is used as a semiconductive transfer roller, the preferred thickness in in a range from 3 to 15 microns for the elastic adhesive layer 14 and in a range from 5 to 30 microns for the surface treating layer 13. Where the conductivity is not a restraint, it is unnecessary to define an upper limit on the thickness of the elastic adhesive layer 14, provided the thickness is greater than 3 microns which is effective for a smaller deformation or greater than 5 microns which is effective for a greater deformation.

Elastomer rollers have been manufactured according to the conventional practice and according to the invention, and the comparative performance will be described below.

[A] Control. Initially, chloroprene rubber admixed with fine powder of carbon is baked onto the core metal and then polished to provide a base roller. A non-tacky surface treating agent comprising fluorocarbon polymer, commercially available from PAMPUS Co., West Germany, as PAMPUS Teflon Spray, was applied thereon so that the film thickness upon drying is equal to approximately 20 microns. The assembly was heated to a temperature of 120° C. for 30 minutes to provide a toner image transfer roller. This roller will be hereafter referred to as roller A.

When 100 V. d.c. was applied to the elastomer roller thus formed to determine the resistance between the core metal of the roller and a measuring electrode connected to the roller surface, it was found that there was observed no change in the resistance before and after the application of the surface treating layer. Subsequently, the roller was incorporated into the electrophotographic copying system, and a transfer bias voltage of 750 V and 1100 V was applied to determine the transfer capability. No difference was found in the transfer capability before and after the application of the surface treating layer.

The roller having no surface treating layer 13 and the roller having the surface treating layer 13 have been employed to produce ten thousand copies, respectively. After the copying operation, an observation of the both rollers revealed a deposition of toner on the roller having no surface treating layer 13, which is believed to be attributable to the permeation of the plasticizer from the rubber. Wiping the roller with a soft cloth failed to remove the toner. On the other hand, some deposition of toner is observed on the roller having the surface treating layer 13, but the majority of toner is successibly removed with soft cloth. However, part of the toner remained when the roller is wiped with soft cloth, and the cloth was then impregnated with trichlorotrifluoroethane before wiping the cloth. The surface treating layer was removed after one or two wiping operations.

[B] Control. Chloroprene rubber admixed with fine powder of carbon was baked to the core metal and then polished to provide a base roller. A non-tacky surface treating agent comprising fluorocarbon polymer, commercially available from WHITFORD Co., the United States, as Xylan 1010, was applied so that a film thickness after drying is equal to approximately 15 to 25 microns. The assembly was heated to a temperature of 150° C. to 20 minutes to cause hardening, thus providing a toner image transfer roller. This roller will be hereafter referred to as roller B.

A d.c. voltage of 100 V was applied to the elastomer roller B to determine the resistance between the core metal and a measuring electrode connected to the roller surface. It was found that the resistance before the application of the surface treating layer is $3\times10^{9}\Omega$, while the resistance after the application of the surface treating layer increased to $3\times10^{10}\Omega$. However, no significant difference in the transfer capability of toner image was found before and after the application of the surface treating layer. (The same transfer voltage was used as in the determination of the roller A.)

Examining the appearance of the roller, it was found that fine cracks were produced in the surface treating layer. After producing ten thousand copies, the number of cracks increased together with a deposition of toner in the region of the cracks. Wiping the roller surface with soft cloth which was impregnated with an organic solvent such as trichlorotrifluoroethane or ethanol, could not easily remove the toner which was deposited in the region of the cracks.

It is to be noted that when the surface treating layer has a thickness equal to or greater than 30 microns, there occurs substantial increase in the electrical resistance accompanied by a concurrent increase in the width of the cracks produced, preventing a practical use of the resulting roller.

[C] Method of manufacturing an elastomer roller according to the invention, and experimental results obtained with the resulting roller will now be described.

(C1) Chloroprene rubber admixed and kneaded with fine powder of carbon was baked to the core metal and then polished to provide a base roller.

(C2) A mixture including 176.0 g of urethane resin (N-2304) manufactured by Nippon Polyurethane Co., 21.4 g of epoxy resin (AW-106) manufactured by Ciba Co., Switzerland, 8.6 g of hardener (HV9530) manufactured by Ciba Co., and 294 g of methyl ethyl ketone, with a total of 500 g, was prepared to provide a liquid to be applied in order to form an elastic adhesive layer. The liquid was applied to the base roller so that a film thickness of approximately 5 to 10 microns was achieved after drying, and subsequently the assembly was heated to a temperaure of 150° C. for 20 minutes for purpose of hardening.

(C3) A coating solution of Xylan 1010 was applied to the roller so that a film thickness of approximately 20 to 25 microns could be formed after drying, and the assembly was heated to a temperature of 150° C. for 20 minutes for purpose of hardening, thus providing a toner image transfer roller, which is hereafter referred to as roller C.

A d.c. voltage of 100 V was applied to the roller thus formed to determine the resistance between the core metal and a measuring electrode connecting to the roller surface. It was found that the resistance was slightly higher than that of the base roller, but no significant difference in the transfer capability of toner image was noted before and after the treatment. It is to be understood that the transfer operation took place under the same conditions as used with the rollers A and B.

An observation of the appearance of the roller failed to fine the occurrence of any crack therein. A soft cloth impregnated with trichlorofluoroethane was used to wipe the roller, without causing a dissolution or elution of the non-tacky surface treating layer.

For purpose of assurance, a cut in the form of a grid was formed in the surface of the roller, and the roller surface was coated by a cellophane tape, which is then strongly peeled off. This exfoliation test revealed a local exfoliation of the surface layer, but there is no problem whatsoever for practical purposes.

[D] Another embodiment of the invention will be described below.

(D1) Chloroprene rubber admixed and kneaded with fine powder of carbon was baked to the core metal and then polished to provide a base roller.

(D2) A mixture including 176.0 g of urethane resin (N-2304) manufactured by Nippon Urethane Co., 21.4 g of epoxy resin (AW-106) manufactured by Ciba Co., 8.6 g of hardener (HV9530) manufactured by Ciba Co., and 294 g of methyl ethyl ketone, with a total of 500 g, was prepared to provide a liquid which as to be applied in order to form an elastic adhesive layer. The liquid was applied to the base roller so that a film thickness of approximately 5 to 10 microns was achieved after drying.

(D3) At a short time interval of approximately five minutes after the application of the liquid to the base roller which was sufficent to allow an evaporation of the solvent, a coating solution of Xylan 1010 was applied to the roller so that a film thickness of about 20 to 25 microns was achieved after drying. The assembly was heated to a temperature of 150° C. for 20 minutes for the purpose of hardening. The resulting roller will be referred to hereafter as roller D.

A test, similar to that applied to the roller C, was made with respect to the roller D thus formed, with substantially similar results.

For the sake of assurance, an exfoliation test was conducted in a similar manner as that applied to the roller C. There occurred no exfoliation, indicating a very good bonding strength.

In the embodiments of the invention described above, the thickness of various layers should be chosen in accordance with the intended use.

By way of example, when the invention is applied to form a roller which does not require an electrical conductivity, an effective elastic adhesive layer may be provided by having a thickness equal to or greater than 3 microns. However, the thickness may be increased to 15 microns or greater so that stresses resulting from a relative deformation between the non-tacky surface treating layer and the inner elastomer layer may be relieved. It is also possible to achieve a proper magnitude of electrical resistance, by admixing fine conductive powder of carbon or the like into the elastic adhesive layer or non-tacky surface treating layer.

In an arrangement utilizing a semiconductive elastomer and avoiding the admixture of an agent which adjusts the electrical resistance with the elastic adhesive layer 14 or non-tacky surface treating layer 13, a preferred thickness of the elasic adhesive layer 14 is from 3 to 15 microns and the thickness of the non-tacky surface treating layer 13 is from 5 to 30 microns.

An increased thickness exceeding such value results in an increased resistance while a thickness less than such value for the elastical adhesive layer 14 results in diminishing the buffering action of the layer and the effect of preventing permeation of the plasticizer from the inner elastomer layer 12. A thickness of the non-tacky surface treating layer 13 which is less than the described value diminishes its effect to prevent the permeation of the plasticizer from the inner elastomer layer 12 and also diminishes the non-tackiness to be maintained over a prolonged period of time.

While the described embodiments relate to the application of the invention to elastomer rollers, it should be understood that the invention is not limited thereto since the invention is generally applicable as a method of providing a non-tacky surface treatment to an elastomer member.

Figure 3A:
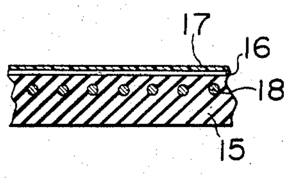
FIGS. 3(*a*) and (*b*) show elastomer belts with non-tacky surface treating layer according to other embodiments of the invention, FIG. 3(*a*) being a schematic cross section taken in a directon perpendicular to the conveying direction of the belt and FIG. 3(*b*) being a schematic cross section taken in a direction parallel to the conveying direction.
Figure 3B:
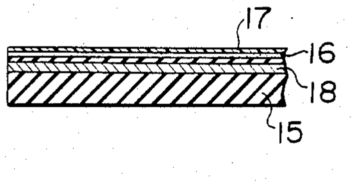

FIGS. 3(*a*) and (*b*) show other embodiments, illustrating elastomer belts to which the invention has been applied. As in the elastomer roller shown in FIG. 2, the elastomer belt shown comprises a base elastomer belt 15, an elastic adhesive layer 15 applied to the belt 15, and a non-tacky surface treating layer 17 comprising hydrocarbon polymer which is applied to the adhesive layer 16. It is to be understood that the elastic adhesive layer 16 and the non-tacky surface treating layer 17 are formed of similar material as those used in forming the rollers C and D, by a similar process.

In these embodiments, when the base belt 15 has an increased thickness, the non-tacky surface treating layer 17 may be greatly stretched or compressed as a result of bending. To minimize such deformation, it is effective to contain a material 18 which resists the deformation, within the base belt 15 in a region adjacent to the surface treating layer 17. When the surface treating layer 17 is subject to tension only, the material 18 may comprise a high-tensile material such as fibers or steel wires. On the other hand, when the surface treating layer 17 is subject to compression only, a high-compressive material such as steel wires may be used.

What is claimed is:

1. An elastomer member with non-tacky surface treating layer which may be used in a developing station, a transfer station or a conveying station of an electrophotographic copying system where deposition of toner is likely, consisting essentially of:

a base of a material which resists deformation having on its surface a base elastomer member which exhibits rubber-like elasticity at room temperature;

an elastic adhesive layer applied to the surface of the base elastomer member, the elastic adhesive layer having a thickness of from 3 to 15 microns and formed of a polyurethane rubber which bonds to the base elastomer member and exhibits a uniform rubber-like elasticity;

and a non-tacky surface treating layer comprising a dispersion of fine powder of fluorocarbon polymer in a binder resin which exhibits resistance to an organic solvent and applied to the surface of the adhesive layer.

2. An elastomer member according to claim 1 in which the base is a roller of a core metal surrounded by the base elastomer member.

3. A elastomer member according to claim 1 in which the base is in the form of a belt.

4. An elastomer member according to claim 1 in which the elastomer member is semiconductive.

5. An elastomer member according to claim 1 in which the surface treating layer has a thickness in a range from 5 to 30 microns where the elastomer member is semiconductive.

6. A method of manufacturing an elastomer member with a non-tacky surface treating layer which may be used in a developing station, a transfer station or a conveying station of an electrophotographic copying system where deposition of toner is likely, comprising the steps of:

applying a polyurethane rubber elastic adhesive to a base elastomer member;

applying heat to the elastic adhesive to harden it into an elastic adhesive layer bonded to the base elastomer member and exhibiting rubber-like elasticity;

applying a suspension of fine powder of fluorocarbon in a solution of a binder resin to the elastic adhesive layer; and applying heat to the suspension to harden it into a non-tacky surface treating layer comprising fluorocarbon polymer.

7. A method of manufacturing an elastomer member having a non-tacky surface treating layer which may be used in a developing station, a transfer station or a conveying station of an electrophotographic copying system where deposition of toner is likey, comprising the steps of:

applying a polyurethane rubber elastic adhesive to a base elastomer member, providing a suspension of fine powder of fluorocarbon in a solution of a binder resin, and applying the suspension to the elastic adhesive before hardening the suspension; and applying heat to a combination of the elastic adhesive and the suspension to harden them into an elastic adhesive layer and a non-tacky surface treating layer comprised of fluorocarbon polymer, respectively.

8. A method of manufacturing according to claim 6 in which the fluorocarbon is selected from the group consisting of polytetrafluoroethylene, tetrafluoroethylene hexafluoropropylene copolymer, tetrafluoroethylene parafluoro alkyl vinyl ether polymer, polychlorotrifluoroethylene, ethylene tetrafluoroethylene copolymer, ethylene chlorotrifluoroethylene copolymer, polyvinylidene fluoride, and polyvinyl fluoride.

9. A method of manufacturing according to claim 7 in which the fluorocarbon is selected from the group consisting of polytetrafluoroethylene, tetrafluoroethylene hexafluoropropylene copolymer, tetrafluoroethylene parafluoro alkyl vinyl ether polymer, polychlorotrifluoroethylene, ethylene tetrafluoroethylene copolymer, ethylene chlorotrifluoroethylene copolymer, polyvinylidene fluoride, and polyvinyl fluoride.

* * * * *